March 15, 1927.  
J. M. HALS  
1,621,366  
CENTRIFUGAL FRICTION COUPLING  
Filed Dec. 15, 1922
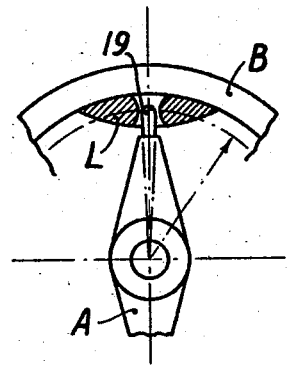
Inventor  
Jorgen M. Hals  
By B. Singer atty Patented Mar. 15, 1927.

1,621,366

UNITED STATES PATENT OFFICE.

JÖRGEN MICHELET HALS, OF OSLO, NORWAY, ASSIGNOR TO J. M. HALS & CO. A/S., OF CHRISTIANIA, NORWAY.

CENTRIFUGAL FRICTION COUPLING.

Application filed December 15, 1922, Serial No. 607,262, and in Norway March 31, 1922.

The present invention relates to a centrifugal friction coupling of the kind in which in the part firmly connected with the driving shaft freely movable coupling pieces are arranged which are pressed by the centrifugal force against the inner side of an annular or wheel-shaped part on the driven shaft. The essential feature of the invention is this, that these centrifugal bodies which are carried by radial pins on the driving device, are formed in such a manner that they may move freely on the said pins and allow a free angular adjustment. Hereby the advantage is obtained that the friction between the driving device and the centrifugal body will not assert itself so that the action of the coupling is only dependent on the centrifugal force or in other words the ideal conditions for couplings of this kind are obtained.

The object of such a coupling is to ensure a starting of the motor without load with uniformly increasing load up to a certain maximum output. Hitherto this effect could not be fully obtained on account of the friction between the driving device and the centrifugal body and with such couplings irregularities in the transmission and therewith vibrations in the machinery and irregularities in the consumption of current could not be avoided if an electric motor were employed as a source of motive power and in fact with the result that the current had a tendency to be interrupted if a maximum current interrupter were introduced into the circuit. The action of many machines moreover is dependent in a high degree on uniform movement, so that even if the working be not interrupted joltings of the kind mentioned are dangerous.

The invention is illustrated in the attached drawing in which:

The figure shows a part of a coupling according to my invention partly in section.

A denotes the driving part which is connected to the driving shaft. B is the driven part and L is the centrifugal body which is supported by a radial pin 19.

The pin and the centrifugal body are so constructed that the centrifugal body may roll or swing on the driving part, that is the centrifugal body must besides being freely mounted on the pin have point or line contact with the same. To obtain the ideal action it is further necessary that the driving pressure be directed directly through or pass outside of the center of gravity of the centrifugal bodies or the point to which the centrifugal forces may be transported.

In order to obtain the stated effect the pins are preferably conical tapering to the axis of the driving shaft and the apertures of the centrifugal bodies should be saddle shaped.

According to the drawing a suitable contact is secured by a radial pin 19 having the form of a blunted cone the point of which lies on the central line of the driving shaft. The aperture of the centrifugal body is saddle shaped in order to allow an automatic peripheral as well as a free angular adjustment of the same.

The form indicated is only mentioned by way of example and the invention is not tied to the different details indicated and illustrated.

Having thus described my invention, what I claim is:

1. In a centrifugal friction coupling a driving element, a radial pin secured rigidly thereto, a centrifugal body supported by said pin and having an enlarged saddle shaped recess for taking up the pin so as to allow an automatic peripheral as well as a radial and angular adjustment of the centrifugal body and a driven part surrounding said body and coacting with the same.

2. In a centrifugal frictional coupling a driving element and a driven element, the driving element being provided with a radial pin having the form of a blunted cone, the point of which lies on the central line of the driving shaft and supporting a centrifugal body having an enlarged saddle shaped recess for taking up the pin so as to allow an automatic radial as well as angular adjustment of the centrifugal body.

In witness whereof I affix my signature.

JÖRGEN MICHELET HALS.